United States Patent
Valadarsky et al.

(10) Patent No.: US 7,339,936 B2
(45) Date of Patent: Mar. 4, 2008

(54) SWITCHING DEVICE FOR TELECOMMUNICATION NETWORKS

(75) Inventors: Yoav Valadarsky, Kfar Saba (IL); David Dmitry Bidny, Rishon Lezion (IL)

(73) Assignee: ECI Telecom Ltd., Petach Tikva (IL)

( * ) Notice: Subject to any disclaimer, the term of this patent is extended or adjusted under 35 U.S.C. 154(b) by 897 days.

(21) Appl. No.: 10/632,839

(22) Filed: Aug. 4, 2003

(65) Prior Publication Data

US 2004/0037290 A1   Feb. 26, 2004

(30) Foreign Application Priority Data

Aug. 8, 2002  (IL) ..................................... 151144

(51) Int. Cl.
  *H04J 3/16* (2006.01)
  *H04J 3/22* (2006.01)
(52) U.S. Cl. .................. 370/395.51; 370/401; 370/466
(58) Field of Classification Search ............. 370/395.5, 370/395.51, 401, 466
  See application file for complete search history.

(56) References Cited

U.S. PATENT DOCUMENTS

| | | | | |
|---|---|---|---|---|
| 6,240,106 B1 * | 5/2001 | Slater | ........................ | 370/517 |
| 6,266,333 B1 | 7/2001 | Kartalopoulos | ............. | 370/395 |
| 6,272,151 B1 | 8/2001 | Gupta et al. | ................ | 370/489 |
| 6,359,859 B1 * | 3/2002 | Brolin et al. | ............... | 370/218 |
| 6,381,247 B1 | 4/2002 | Munter et al. | .............. | 370/419 |
| 6,414,953 B1 | 7/2002 | Lamarche et al. | .......... | 370/359 |
| 6,498,792 B1 * | 12/2002 | Johnson et al. | ............. | 370/388 |
| 6,498,794 B1 * | 12/2002 | Tsukamoto et al. | ...... | 370/395.1 |
| 6,879,592 B1 * | 4/2005 | Hirayama et al. | ....... | 370/395.1 |
| 7,013,348 B1 * | 3/2006 | Carson et al. | .............. | 709/238 |
| 7,139,271 B1 * | 11/2006 | Parruck et al. | ............. | 370/392 |
| 7,139,277 B2 * | 11/2006 | Ofek et al. | ................. | 370/401 |
| 7,142,564 B1 * | 11/2006 | Parruck et al. | ............. | 370/474 |
| 7,177,314 B2 * | 2/2007 | Wu et al. | ............... | 370/395.51 |
| 7,240,347 B1 * | 7/2007 | Lim et al. | ................... | 718/100 |

FOREIGN PATENT DOCUMENTS

| EP | 1 091 529 A2 | 4/2001 |
|---|---|---|
| WO | WO 00/76156 A1 | 12/2000 |

\* cited by examiner

*Primary Examiner*—Hassan Kizou
*Assistant Examiner*—Brian T O'Connor
(74) *Attorney, Agent, or Firm*—Harold L. Novick; The Nath Law Group

(57) ABSTRACT

A switching device for telecommunication networks, which comprises I/O ports, arranged by groups in I/O cards, for inputting incoming data streams and outputting outgoing data streams of arbitrary protocols, a switching fabric SF for handling internal data streams, a number of adaptation functional blocks AFBs associated with the switching fabric SF and forming a common pool of AFBs. The switching device also comprises a distribution block DB for switching between the I/O ports and the adaptation functional blocks AFBs, and configurable to provide a required connection between any of the I/O ports positioned on any of the I/O cards, and any of the adaptation functional blocks AFBs from the common pool of AFBs.

20 Claims, 6 Drawing Sheets

SWITCHING DEVICE FOR TELECOMMUNICATION NETWORKS

FIELD OF THE INVENTION

The present invention relates to a switching device including a switching fabric and having a large number of input/output ports, for example an ATM switch capable of switching and transforming numerous incoming data streams which may have different protocols.

BACKGROUND OF THE INVENTION

Asynchronous Transfer Mode (ATM) is a cell-based transport and switching technology. ATM provides high-capacity transmission of voice, data, and video within telecommunications and computing environments. ATM is a transport technology that formats all information content carried by the network into 53-byte cells. Since these cells are short in length and standard in size, they can be switched through network elements known as ATM switches with a little delay, using what is referred to as an ATM switch fabric. Since various types of traffic can be carried on the same network, bandwidth utilization can be very high. These characteristics make the network very flexible and cost effective. An ATM switch fabric operates to direct ATM cells from one interface to another. In this way the ATM switch fabric operates in response to dynamically changeable virtual connection information contained within the cell. ATM cells may be encapsulated and transmitted over SONET data frames, for example using STS-1 or STS-Nc, which is a concatenation of N STS-1 signals, or over SDH data frames using STM-1 or STM-N. STS-1 is a basic data stream in SONET, STM-1 is a basic data stream in SDH, wherein SONET (Synchronous Optical NETwork) and SDH (Synchronous Data Hierarchy) are synchronous hierarchies of data transmission, preferably via optical communication networks.

In many cases customers require support for both ATM switching and SONET/SDH switching in their communications systems. However, devices provided by vendors to support SONET have typically lacked the capability to also support ATM. In particular, typical existing ADMs (Add Drop Multiplexers) have supported only SONET/SDH ring networks, while existing ATM switches have generally supported only ATM networks.

Accordingly, if a customer has needed both SONET/SDH and ATM networks, they have necessarily had to purchase dedicated SONET/SDH equipment (ADMs), in addition to ATM switches. This is costly in terms of necessitating multiple devices. In addition, most customers cannot predict what their future communications requirements will be when they buy one piece of equipment. Because existing systems have been restricted to supporting only one of either SONET/SDH or ATM switching, they have not been flexible or scalable with regard to adding support for the other protocol. As a result of such inflexibility, changes in customer requirements may require the purchase of completely new devices to support a previously unsupported protocol. Accordingly, there was a need for a communication device which is capable of forming multiple configurations to support STM only, ATM only, or hybrid STM/ATM operation. Moreover, the device should be scalable such that additional functionality may be conveniently added as the needs of the customer change over time.

The above task was partially solved by providing a multi-service network node similar to that described in a European patent publication EP 1091529 A2.

EP 1091529 A2 describes a telecommunication network node capable of processing signals transmitted according to different protocols, namely a node with "multiprotocol" capability. The node is able to combine the homogeneous (or strictly shared out among the various types of traffic) payload of the frames coming into it. The node comprises means able to process the received frames and produce, according to the special needs, frames with homogeneous payloads and/or hybrid/multiprotocol payloads shared out in a flexible manner. The node avoids the need to construct different networks for each type of transmission (SHD, PDH, IP, ATM, Ethernet, ... ). FIGS. 1a and 1b of the EP application illustrate a block-diagram of the node, comprising a number of input/output (I/O) blocks, a number of adaptation blocks and a switching fabric, being in this case an ATM/IP cell and packet switch. In the configuration described in EP 1091529 A2, all I/O ports of each specific I/O block are coupled/associated with a particular functional block responsible for adaptation of information received via this specific I/O block to the switching fabric of the node.

In practice, one I/O block comprising a number of I/O ports and its suitable adaptation function are implemented on one and the same printed card. The fact of predetermined interconnection between an I/O block and a particular adaptation function does not allow accessing this particular function from an I/O port not belonging to the mentioned I/O block, for example from any new location. Thereby, the above-described configuration with a pre-set design imposes problems when the network needs upgrading or modifying.

A similar problem exists in pure ATM or other switches where, due to the initial design, access to a particular adaptation function is limited by a number of I/O ports connected to the suitable functional adaptation block.

Another drawback of the solution proposed in EP 1091529 A2 is that the high order STM-N and the low order PDH data streams are treated in separate routes using separate matrices before applying thereof to adaptation functions. The matrices can be connected (say, for splitting a high order data stream into a number of low order data streams for further treatment) only via special adaptation functional blocks. Moreover, even if connected to one another, the low order matrix will be incapable of handling all high order data streams arriving to the high order matrix at a time (i.e., will be blocking), due to limitations which are intrinsic to the architecture of two-stage switching SDH/SONET equipment.

Another solution of a hybrid switching structure is WO 00/76156 A1, which describes architecture for a SONET network element, such as a hybrid STM/ATM add-drop multiplexer (ADM). The disclosed system includes an interconnection system for a network element, including a line unit LU (serving for aggregate line input/output), a switch fabric SF, and two or more service units SU serving for ADD-DROP input/outputs. The switching structure of WO 00/76156 A1 works as a typical ADM where two line (aggregate) links exist and all ADD-DROP traffic is cross-connected to both line links. In the WO 00/76156 A1, a network portion (LU units) and a client's add/drop portion (SU units) are not universal, i.e., cannot replace one another. The way of providing the ATM switching functionality in that solution is similar to the typical implementation of ATM switching equipment, where the I/O ports are permanently associated with specific service (adaptation) functions.

Also in the solution of WO 00/76156 A1, access to a particular adaptation function is limited by a number of I/O ports associated with a suitable functional adaptation block.

SUMMARY OF THE INVENTION

It is therefore an object of the present invention to provide a flexible architecture of a telecommunication switching node comprising a switching fabric, which would enable easy upgrading of the switch capability and universal use of its input/output ports.

Further objects and features of the invention will become apparent from the following description and the accompanying drawings.

The above described object can be achieved by providing a switching structure (device) for telecommunication networks, comprising:

a number of I/O ports for inputting incoming data streams and outputting outgoing data streams of arbitrary protocols, a switching fabric SF for handling internal data streams, a number of adaptation functional blocks AFBs associated with said switching fabric SF, each AFB being capable of performing at least one of the following adaptation functions:

i. converting one or more of said incoming data streams or of portions of said incoming data streams into one or more said internal data streams suitable for being handled in the SF; and ii. converting one or more said internal data streams handled by the SF into one or more said outgoing data streams or portions thereof; and a distribution block DB adapted to allow switching between said I/O ports and said adaptation functional blocks AFBs and configurable to provide a required connection between any of said I/O ports and any of said adaptation functional blocks AFBs.

According to the preferred embodiment, the switching fabric is an ATM switching fabric (ATM switch). However, the switching fabric may also constitute an Ethernet switch, an IP switch, a router, etc.

Most preferably, said AFB blocks form integral part of the switching fabric SF and are implemented on one and the same printed circuit with said SF. Though, they may be implemented separately in the form suitable for interconnection with the SF.

It should be understood that the switching fabric SF, together with the AFB blocks, is capable of providing a number of switching and/or combining functions with an incoming data stream or portions thereof when obtained from an I/O port via the DB. An internal data stream handled by the SF is usually outputted via a particular AFB which may be the same but may also be different from that used for the incoming data stream, and forwarded by the DB to an I/O port different from that used for the incoming data stream.

Preferably, the DB comprises a cross-connect, for example a TDM cross-connect capable of handling both high and low order SDH/SONET data streams as well as PDH data streams. The DB can be defined as a configurable switching matrix with a low granularity, capable of handling both high order and low order data streams in a non-blocking way. Description of some features of such a switching matrix of low granularity can be found in a co-pending IL patent application No. 148391 filed 26 Feb. 2002 and which is incorporated herein by reference.

In view of the above, said portions of the incoming data streams are to be understood as low order streams being components of the high order incoming data streams, separated in the DB.

According to the preferred embodiment, the DB is capable of switching PDH (E1, E3, DS3) and SDH/SONET (high and low order payloads) data streams applied to the DB. Such a DB can be called a TDM cross-connect 4/4c/3/2/1 which respectively corresponds to handling virtual SDH containers VC-4, VC-4c, VC-3, VC-2 and VC-12 or corresponding SONET containers.

The switching device is preferably adapted to handle the incoming data streams having protocol(s) selected from the following non-exhaustive list comprising: ATM, IP, Ethernet, PDH (Plesiochronous Digital Hierarchy) (TDM), SDH (Synchronous Digital Hierarchy)/SONET(TDM), Frame relay, Optical signals such as ESCON, FICON, Fiber Channel.

Further, according to the preferred embodiment where the DB is a TDM (Time Division Multiplexing) cross-connect, the incoming data streams can be respectively enveloped into a SONET/SDH suitable for being handled in the distribution block DB. In a particular case, at least some of the I/O ports can be provided with means for formatting the incoming data streams into the SONET/SDH format.

Further, the distribution block DB can be configurable to interconnect between any of said I/O ports and any other of said I/O ports if so desired, in case processing in the switching fabric is not required or impossible for a particular data stream.

According to yet a further embodiment, the distribution block DB comprises one or more free ingress/egress connections and is further configurable to interconnect any of said I/O ports to any of the ingress/egress connections thereby enabling exit from the DB to the outside and access from the outside to the DB. Actually, the ingress/egress connections are any connections selected among the DB connections.

Such ingress/egress connections can be used for connecting the I/O ports of the structure with outside adaptation functional blocks which are not comprised in the said (basic) SF.

Namely, the switching structure may comprise an additional switching fabric (e.g. associated with other AFBs than the basic switching fabric), and/or an additional switching fabric performing switching functions for internal data streams having other protocol than those handled by the basic SF. For example, the first switching fabric may be an ATM SF, while the additional SF may be another ATM SF, or switching fabrics handling IP, Ethernet, TDM, SDH, etc. In this way, upgrading of the switching structure capability can be achieved.

Each of the additional switching fabrics can be associated with a number of its functional adaptation blocks.

As mentioned before, the DB e.g., a cross-connect, can be configured and re-configured by assigning specific I/O ports to specific FAB blocks, other I/O ports or specific enter/exit contacts. Moreover, the DB is configurable to perform a protection function.

For example, two I/O ports receiving equal incoming data streams from a main communication path and a protection communication path, can be coupled to one and the same AFB. In a case of fault of one of the I/O ports, the DB will be capable of receiving the incoming data stream from the second I/O port. And wise versa, an internal data stream outgoing from the SF via a particular AFB can be copied in the DB and form two outgoing streams leaving the switching structure via the two I/O ports. This example refers to the case of 1+1 protection principle (traffic and hardware protection). Another example (1:1) relates to a case where one I/O port is assigned as a stand-by port for another (main) one. The stand-by port is activated by the DB only when the transmission of data via the main port fails.

However, the DB can be configured to perform a so-called 1:n protection principle for hardware, where n data streams (I/O ports) are protected by a single spare one which can be used if one of the n data streams fails.

Due to the fact that in the previously known switching architectures each adaptation function block was connected to a group of I/O ports, the number of I/O ports capable of using this function was limited by the group.

In the proposed switching device, each I/O port (and each group of ports as well) is de-coupled from a particular functional adaptation block, thereby the use of the AFB and the use of the I/O ports becomes much more flexible. The de-coupling is achieved by a novel distributing block for connecting each particular I/O to a required switching fabric via a suitable AFB.

It is especially useful for implementing a so-called IMA adaptation function (Inverse Multiplexing over ATM), where quite a great number of incoming data streams is to be applied to one adaptation functional block. Up to now, it was considered obligatory to allocate all the incoming data streams at one and the same I/O block. The proposed solution allows resolving this problem.

In practice, the I/O ports of the switching structure can preferably be situated, by groups, at separate printed cards which may comprise as many I/O ports as desired. The switching fabric interconnected with the AFB blocks are preferably placed at one and the same printed card. Additional switching fabrics (preferably together with the adaptation functional blocks), if required for serving additional data streams and/or data streams of different protocols, can be positioned at additional cards.

The distributing block DB can be placed either on the card of the I/O ports, or separately. The cards can be installed in slots of a standard shelf-structure having a back plane, so that interconnection between the I/O ports and the switching fabric(s) will be provided using the back plane, according to the configuration of the distribution block DB.

This feature renders the proposed switching structure easily upgradable and therefore suitable for cellular applications, where a great number of new incoming data streams are to be handled in case of upgrading the network. For example, when upgrading a cellular network from 2G-2.5G to 2.5G-3G, new E1 data streams which should be handled using one and the same particular AFB will be added to each base station, thereby requiring additional I/O ports and access to the particular AFB in the switching structures of the network. The solution proposed in the present application allows achieving this purpose, by providing an ATM switching fabric (which is preferred in the modern telecommunication networks) with I/O ports capable to format incoming data streams into a suitable format, and with a distribution block DB. If required, any port will be connectable to the required AFB of the ATM switching fabric.

Therefore, the proposed architecture is most preferred and can easily be adapted for serving cellular telecommunication networks.

Moreover, since the I/O ports are de-coupled from the AFBs, the cost of protection provided in the proposed solution is just the cost of an additional I/O port or I/O block, which is significantly lower than the cost of an assembly comprising an I/O block and an adaptation function as it was in the known switching structures.

Yet another advantage of the proposed architecture is that the described switching device can be used for building a so-called multi ADM or ADM with universal I/O ports, as compared to the WO 00/76156. Indeed, owing to separation of the I/O ports from adaptation functions that might be applied to the incoming/outgoing data streams or portions thereof, any of the I/O ports can be used either as a line port (aggregate) or as an ADD-DROP port (tributary).

A multi ADM, owing to its high flexibility, allows easy upgrade of the network, for example organizing an additional network ring. The switching device with universal I/O ports, if used in the multi-ADM, enables such an operation. The proposed combination of the inventive multi-service switching device and the concept of multi-ADM will therefore produce a so-called multi-service multi ADM.

According to a further aspect of the invention, there is also provided an assembly (a printed card) to be used in a switching structure, wherein the switching structure is intended for inputting incoming data streams of arbitrary protocols via I/O blocks, converting the incoming data streams into internal data streams by adaptation functional blocks, handling the internal data streams in a switching fabric SF, converting the internal data streams into outgoing data streams of arbitrary protocols by the adaptation functional blocks and outputting the outgoing data streams via the I/O blocks, and the assembly comprises the switching fabric SF integrally interconnected with a number of said adaptation functional blocks.

Preferably, the switching fabric SF in the assembly is an ATM switching fabric ATM SF.

Preferably, the assembly comprises at least one adaptation functional block capable of performing IMA function (Inverse Multiplexing over ATM) with respect to a number of incoming/outgoing data streams.

By yet another aspect of the invention there is provided a method of switching data streams in a switching structure comprising a number of I/O ports, a number of adaptation functional blocks AFBs, and a switching fabric SF, the method comprises the steps of:

inputting incoming data streams of arbitrary protocols via the I/O blocks;

formatting at least some of the incoming data streams to obtain all incoming data streams in a common format suitable for further distribution;

distributing the thus formatted incoming data streams or portions thereof between the adaptation functional blocks so that any such incoming data stream or portion thereof is connectable to any AFB;

converting the thus formatted incoming data streams or portions thereof, into internal data streams by adaptation functional blocks AFBs;

handling the internal data streams at a switching fabric SF;

converting the internal data streams by the adaptation functional blocks into data streams formatted using the common format; and distributing the thus obtained formatted data streams between the I/O bocks to be further outputted in arbitrary protocols.

Preferably, the SF in the method is an ATM SF, the distribution is provided at the SDH/SONET (TDM) or PDH (TDM) format.

BRIEF DESCRIPTION OF THE DRAWINGS

The present invention will be further described and illustrated with reference to the following non-limiting drawings, in which.

DETAILED DESCRIPTION OF THE PREFERRED EMBODIMENTS

Figure 1A:
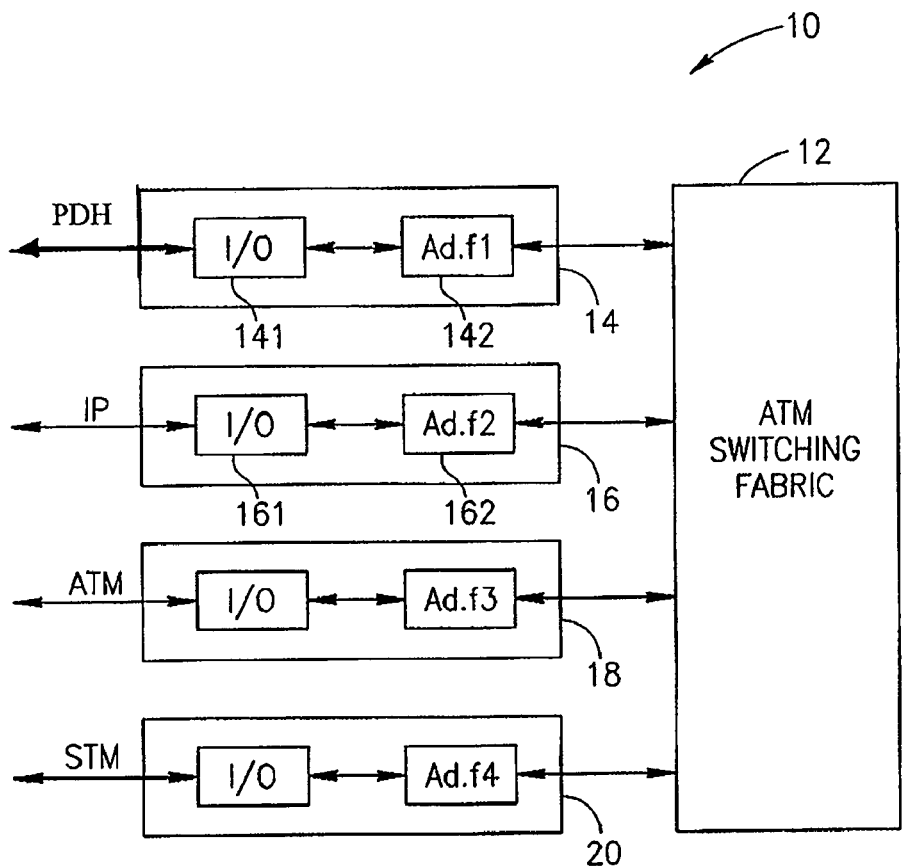
FIGS. 1a, 1b schematically illustrate known switching structures, where each I/O block is associated with its specific adaptation functional block.

FIG. 1a illustrates one known principle of organizing a switching unit; in this example a hybrid switching unit 10 is shown. In the drawing, an ATM switch or switching fabric 12 is connected to several modules: 14, 16, 18 and 20. Each of the modules (say, 14) includes an I/O block (141) which comprises a group of I/O ports which are bi-directionally connected to a particular adaptation function block (142). The adaptation function blocks of the modules 14, 16, 18, 20 are connected to the switching fabric 12, also in a bi-directional manner.

In this example, different modules serve incoming/outgoing data streams having different protocols.

Each adaptation function block belonging to a particular module serves only the I/O ports belonging to the I/O block of the module and in no way can serve a data stream from an I/O port belonging to a different module.

Figure 1B:
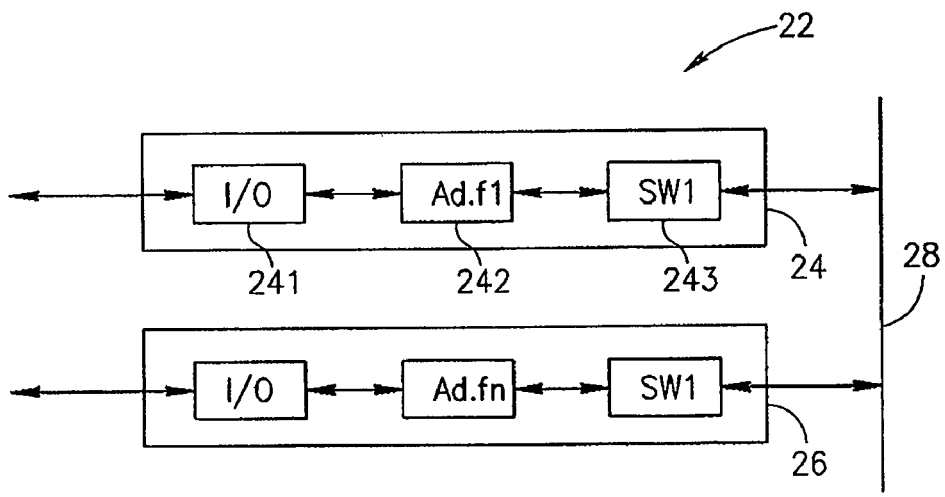

FIG. 1b illustrates another modification 22 of known switching structures. The modules 24 and 26 are so organized to provide separate switching for each type of data streams. Each of the modules (say, 24) comprises an I/O block (241), an adaptation function block (242) and also a local switch (243). Again, access to any of the modules, for using its adaptation function and the switching ability, is limited by the number of I/O ports in the I/O block of the module. The scheme further comprises a common bus 28.

However, a combined scheme can be built, comprising a switching matrix (similar to that shown as 12 in FIG. 1) instead of the bus 28. Such a combined modification is a two stage switching scheme.

One can see that both of the above-illustrated schemes are not flexible and would require new modules if more I/O ports should appear (the situation of upgrading). From the point of protection (for example, when a data stream is to be received/outputted via two paths to ensure the non-interrupted service) it can be provided only by doubling the modules, which is quite expensive.

Figure 2:
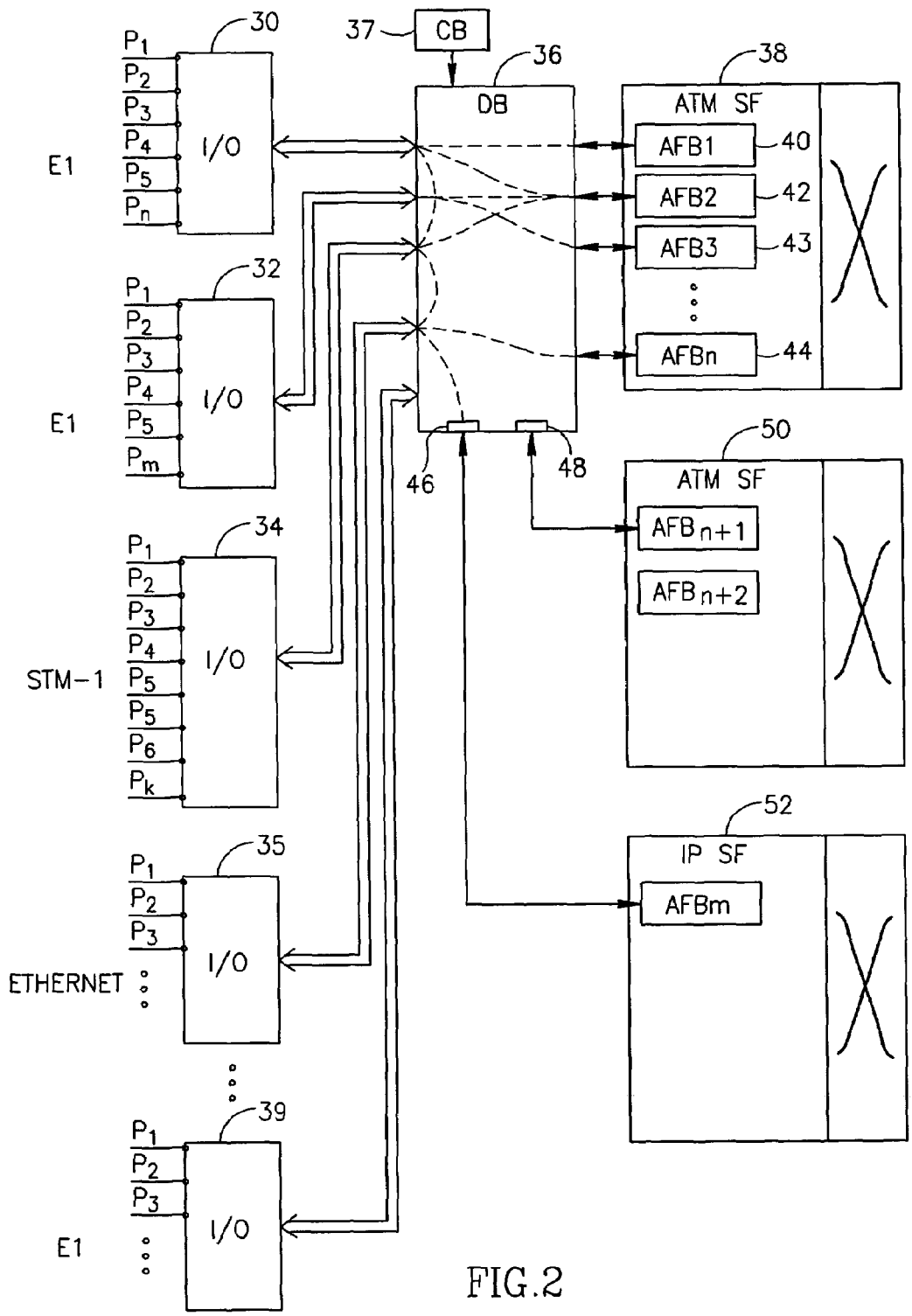
FIG. 2 schematically illustrates the proposed ATM switching device.

FIG. 2 shows the proposed concept of architecture which enables increasing the number of I/O ports having access to the switching fabric (flexibility), and thus increases upgradability and "protection ability" of the switching structure.

The basic proposed switching structure comprises the following elements.

a number of I/O blocks (cards) 30, 32, 34, 35, 39 which may serve for various protocols (ATM, PDH, SDH, IP, Ethernet, WDM, etc.) but do not require that all ports of a particular I/O block be occupied by streams of the same protocol;

a distribution block DB 36 with a Control block 37; DB in this example constitutes a TDM cross-connect matrix capable of handling both high order and low order data streams, and a switching fabric 38 (in this example, an ATM switching fabric ATM SF) comprising "n" adaptation functional blocks AFB marked 40, 42, 43 and 44.

Some I/O blocks (35) are provided with means (not shown) for formatting the data streams incoming via I/O ports into SDH/SONET format.

Each I/O port, marked as a point and indicated as Pi on an I/O block, is connected to the DB 36 via a bus. The connections between the I/O ports and the DB 36 are shown as a number of bi-directional wide arrows. For example:

I/O blocks 30, 32, 39 comprise E1 ports (PDH format).

I/O block 34 comprises STM-1 ports (SDH format).

I/O block 35 comprises Gigabit Ethernet ports (Ethernet format). The block enables encapsulating the incoming Ethernet frames data streams into SDH containers.

Figure 4A:
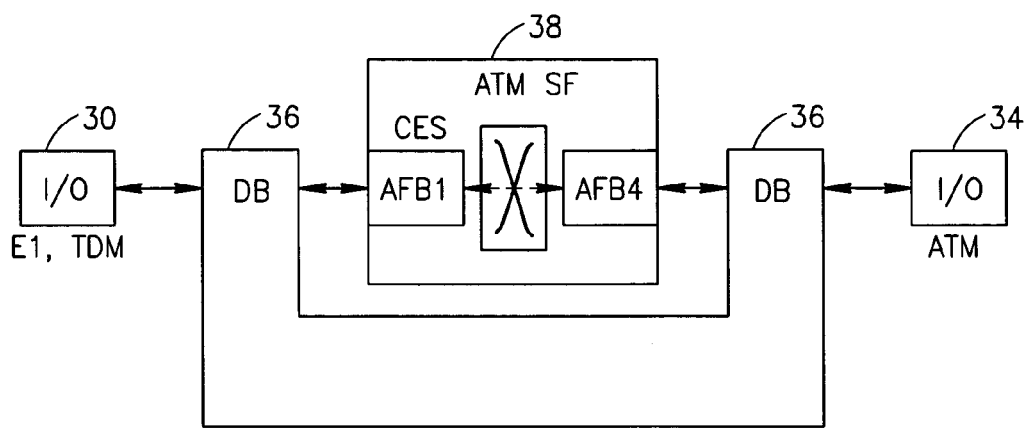
FIGS. 4a, b, c schematically illustrate a number of adaptation functions which can be performed by the ATM structure.

In the I/O block 30, port P1 carries E1 comprising TDM traffic; it is sent to DB 36 which directs it to port P3 in I/O block 34 in the SDH format (see also FIG. 4a).

Port P2 in I/O block 30 also carries a TDM traffic E1, is sent to DB and directed by the DB to an adaptation function block AFB1 (in this case, AAL-1 for Circuit Emulation CES, block 40).

In the I/O block 32, port P3 may carry E1 comprising TDM and ATM traffic, it is sent to DB which directs it to ATM SF block 38 via the adaptation function block AFB3 43. The AFB3 converts all the incoming data into ATM cells.

Port P3 and P5 in I/O block 30 and P2 in I/O block 32 are received as E1 streams comprising ATM data, sent to the DB and then directed to AFB2 (block 42) to be processed as ATM IMA group # 1.

If an additional member of the group is to be added, it is possible to use not only the I/O blocks 30 and 32, but also, for example, the I/O block 34: a stream may enter port P6 in block 34 as an STM-1 carrying VC-12 carrying E1, be sent to DB and directed to block ATM SF 38 via the same adaptation functional block AFB2 (42) responsible for arranging the IMA group # 1.

In the I/O block 35, port P1 receives Ethernet packets which are then encapsulated into SDH containers and sent to DB, that directs them to I/O block 34 which is capable of receiving SDH format.

In the I/O block 35, port P2 receives Ethernet frames carrying Internet packets which are then encapsulated into SDH containers and sent to DB, that directs them, via enter/exit contact 46 of the DB 36 towards IP SF block 52 which is capable of switching IP packets embedded in the Ethernet frames.

In the I/O block 35, port P3 receives Ethernet frames which are then encapsulated into SDH containers and sent to DB, that directs them to the ATM SF 38 via an adaptation block AFBn.

All the data flows mentioned and/or shown above are bi-directional.

The DB 36 is configured via a Control block 37 controlled by a Network Manager (not shown). The configuring is performed by assigning external contacts and internal connections in the low granularity switching matrix, upon which the distribution block DB establishes the required connections. For example, it can be a classical connection between any I/O port and any AFB in the switching fabric 38. As has been mentioned, it is also possible that a data stream arrived from one I/O port may be sent to another I/O port without adaptation or switching.

Sometimes, a data stream is to be protected, e.g., sent to the switching fabric 38 from two different I/O blocks or sent from the fabric 38 to two different I/O blocks (1+1 scheme). Sometimes, one spare standby I/O port is reserved for a number of active I/O ports. Such a standby port can be used if one of the previously active ports appears to be faulty (a 1:n scheme).

For example, I/O block 39 serves for protection of blocks 30, 32 (a scheme 1:2). These internal connections in DB 36 are not shown.

All assignments and re-assignments in the DB, including protection, are handled by the DB Control block 37.

If there is a data stream, arrived from any I/O port, which cannot be switched by the basic switching fabric 38, it can be routed outside the basic structure via a so-called exit/enter contact 46, 48, . . . of the DB. For example, an additional ATM SF 50 can be reached via the enter/exit contact 48, if an adaptation function AFBn+1 is required for processing of any I/O incoming data stream (or portion thereof). Actually, these enter/exit contacts are regular contacts of the DB (cross-connect), and are marked specifically only for the purpose of the present description.

Each schematic dotted line, indicating one of the above-mentioned connections inside the DB 36, reflects either the whole data stream transferred between a particular I/O port and a particular AFB, or at least one portion of that data stream. The same reservation applies to other figures of the patent application.

The proposed switching structure allows providing as many I/O ports as desired (e.g. spare I/O cards for future network upgrade) and using any I/O port of any I/O block for connecting it to any adaptation function block according to a particular requirement in the network. The modularity of the structure enables introducing additional switching fabrics which can also be accessible from any I/O port.

Protection of the data and of the equipment can be provided at the level of I/O blocks, which is cheaper than when the protection is to be provided at the level of modules (FIG. 1a, b).

Figure 3:
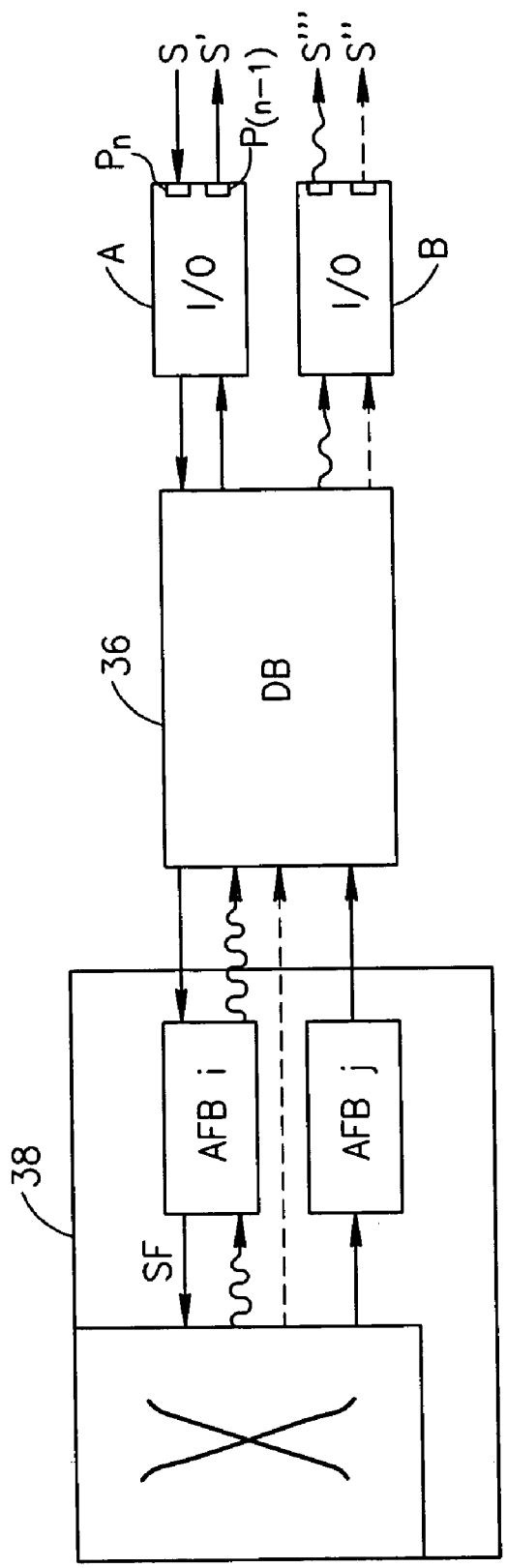
FIG. 3 schematically illustrates an exemplary route of a data stream via the proposed ATM switching structure.

FIG. 3 shows schematic possible routes of an arbitrary data stream S switched by means of the proposed switching device. Numerals of blocks in FIG. 3 are mainly those used for the similar blocks in FIG. 2. An incoming data stream S is fed to an I/O block A via a port Pn, enters the DB 36 which connects the stream to the adaptation function block AFBi. Upon handling in the AFBi, the stream becomes an ATM cells stream. It is then handled by the switching fabric 38 and, on its back way, can be treated in the following three ways:
   a) converted before outputting by another adaptation function block AFBj, upon which it is sent by the DB, say, to a port Pn−1 of the I/O block A (shown by a solid line and marked S').
   b) sent "as is" to the DB, (actually, this operation is also a kind of adaptation function, a so-called null-function which may deal with stuffing idle bits, etc) from which it is forwarded to another I/O block B. This way is shown by a dotted line and marked S". It should be noted that the null-funciton may be used also in the opposite direction, i.e., for entering a stream into the SF 38.
   c) sent back via the same adaptation functional block AFBi, and upon passing DB is forwarded to, say, another port of the I/O block B. This route is shown by a wavy line and indicated as S'''.

Examples of various adaptation functional blocks dealing with particular data streams will be shown in FIGS. 4a, b, c.

FIG. 4a illustrates an example, when an E1 TDM data stream, entering the switching structure via a port of I/O block 30, is forwarded by DB 36 to an adaptation function AFB1 being a circuit emulation service CES, upon which it is switched in the ATM form by the ATM switching fabric 38 and outputted, via AFB4 responsible for encapsulating the ATM cells into SDH format, to a port of I/O block 34, as an ATM cell stream in the SDH format. The reverse direction of the stream is also possible, i.e., from the I/O 34 to the I/O 30.

E1 TDM data streams of the rate 2 Mb/s, usually carrying voice, are in use in 2.5G cellular networks, and can be obtained from a Base Transceiver Station BTS.

Figure 4B:
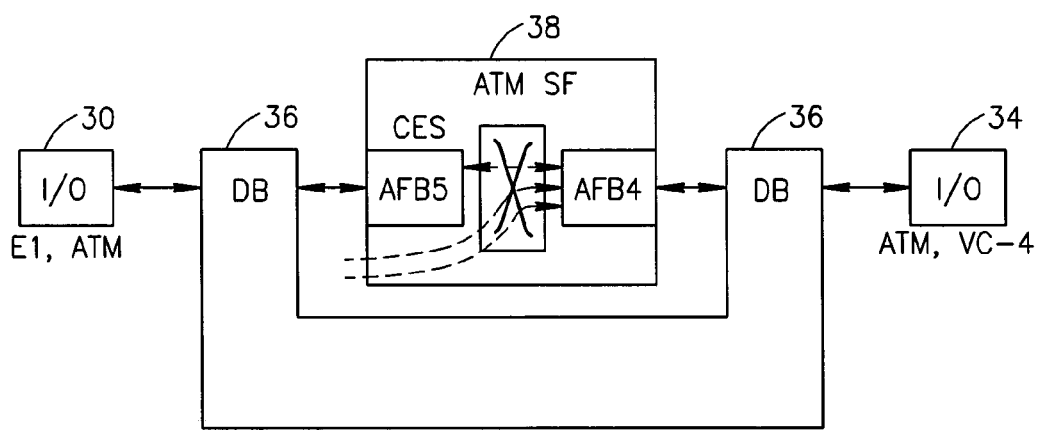

FIG. 4b illustrates another example, where an E1 stream comprising ATM cells is obtained at I/O block 30 (say, also at the rate 2 Mb/s). Such a stream is typical for access networks of cellular systems of the third generation 3G, and are produced by a specific equipment (Node B) (the name used for Base Transceiver Station in 3G). Being routed by DB 36 to an AFB5, it is stripped, possibly aggregated in the ATM switch fabric 38 with other ATM streams (shown schematically by dotted arrows), and outputted via an adaptation function block AFB4 as ATM cells packed into a VC-4 virtual container (SDH/SONET). This stream, via the DB 36, arrives to the I/O block 34.

Figure 4C:
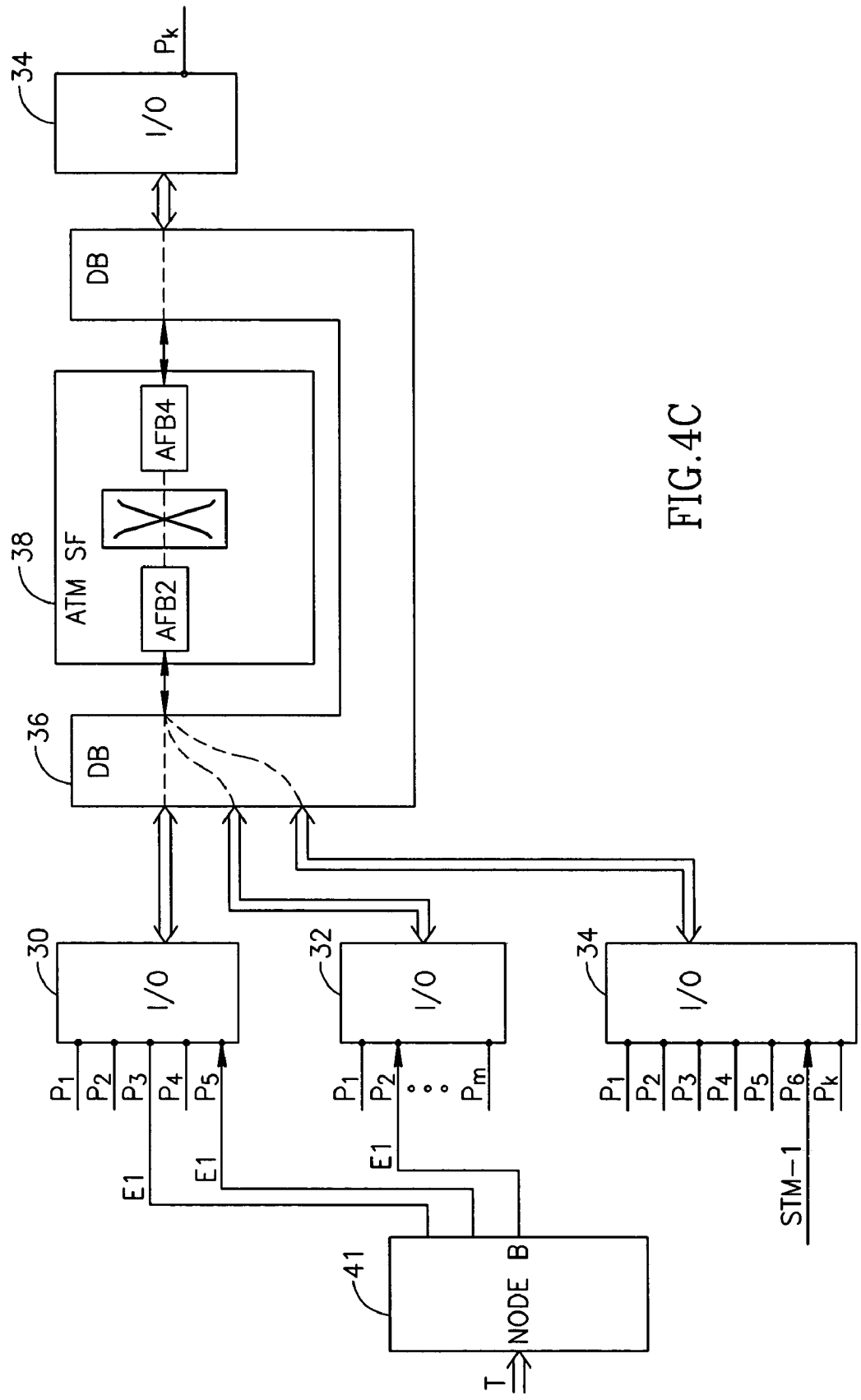

FIG. 4c illustrates yet another possibility of handling incoming data streams in the proposed switching structure, by implementing a so-called IMA adaptation function (IMA—Inverse Multiplexing over ATM). IMA provides a modular bandwidth for user access to ATM networks and for connection between ATM network elements, at rates between the traditional order multiplexing level. For example, it may be required to achieve rates between the DS 1/E1 and DS3/E3 levels in the asynchronous digital hierarchies. DS3/E3 physical links are not necessarily readily available throughout a given network. Therefore the introduction of ATM Inverse Multiplexers provides an effective method of combining the transport bandwidths of multiple links (e.g., DS1/E1 links) grouped to collectively provide higher intermediate rates.

The ATM Inverse Multiplexing technique involves inverse multiplexing and de-multiplexing of ATM cells in a cyclical fashion among links grouped to form a higher bandwidth logical link whose rate is approximately the sum of the link rates. This is referred to as an IMA group. IMA groups terminate at each end of the IMA virtual link. In the transmit direction, the ATM cell stream received from the ATM layer is distributed on a cell by cell basis, across the multiple links within the IMA group.

In the example shown in FIG. 4c, Node B (41) handles a data stream T formed from data sent by subscribers of a cellular network. The data stream T cannot be transmitted and handled as is; due to that it is "inversely multiplexed" in the Node B into four E1 data streams, which compose a so-called IMA group in this example. The IMA group is to be handled in a special manner in the switching fabric SF. To this end, it should be fed, as a group, to one and the same AFB. In presently existing solutions, an IMA group could be handled only if fed via successive I/O ports in one and the same I/O block.

In our example, three E1-ATM data streams of one and the same Node B may arrive from ports of different I/O blocks 30, 32, and the fourth stream STM-1 carrying E1 may arrive from the I/O port 34 (the fact impossible in the previously known architectures). All these streams, in the similar forms upon passing DB are fed to an AFB2 implementing the IMA function (Inverse Multiplexing over ATM). It should be emphasized that, owing to the distribution block 36 which collects E1 streams from I/O ports and forwards thereof to the required adaptation functional block, streams of one IMA group can be applied not only to non-adjacent ports of one and the same I/O block, but even to different I/O blocks (cards), which makes the architecture more flexible and efficient. In a general case, the IMA functional block may receive up to 32 E1 data streams; one Node B generates up to 8 E1 streams. The combined stream is switched in the ATM SF 38, and sent via an AFB4 as a VC-4 SDH data stream to another port (Pk) of the I/O block 34.

The example of FIG. 4c is applicable to a case when a growing amount of data is to be transmitted from a cellular access network to a Metro Area Network (MAN), a great number of E1(E3) data streams obtained at the access network via base stations from numerous subscribers (such as broadband cellular phones) must be processed to introduce a great amount of broadband data into the Metro Area Network (MAN), usually in the form of an SDH stream. New data streams must be introduced with minimal expanding of the existing equipment (I/O cards, ATM switches).

Inserting a distribution block (DB) between the I/O ports and the switching fabric (a regular ATM switch) enables to resolve the problem. Interconnection between the DB and other elements of the architecture is performed using a back plane of the hybrid unit. That can be schematically illustrated in FIG. 5.

Figure 5:
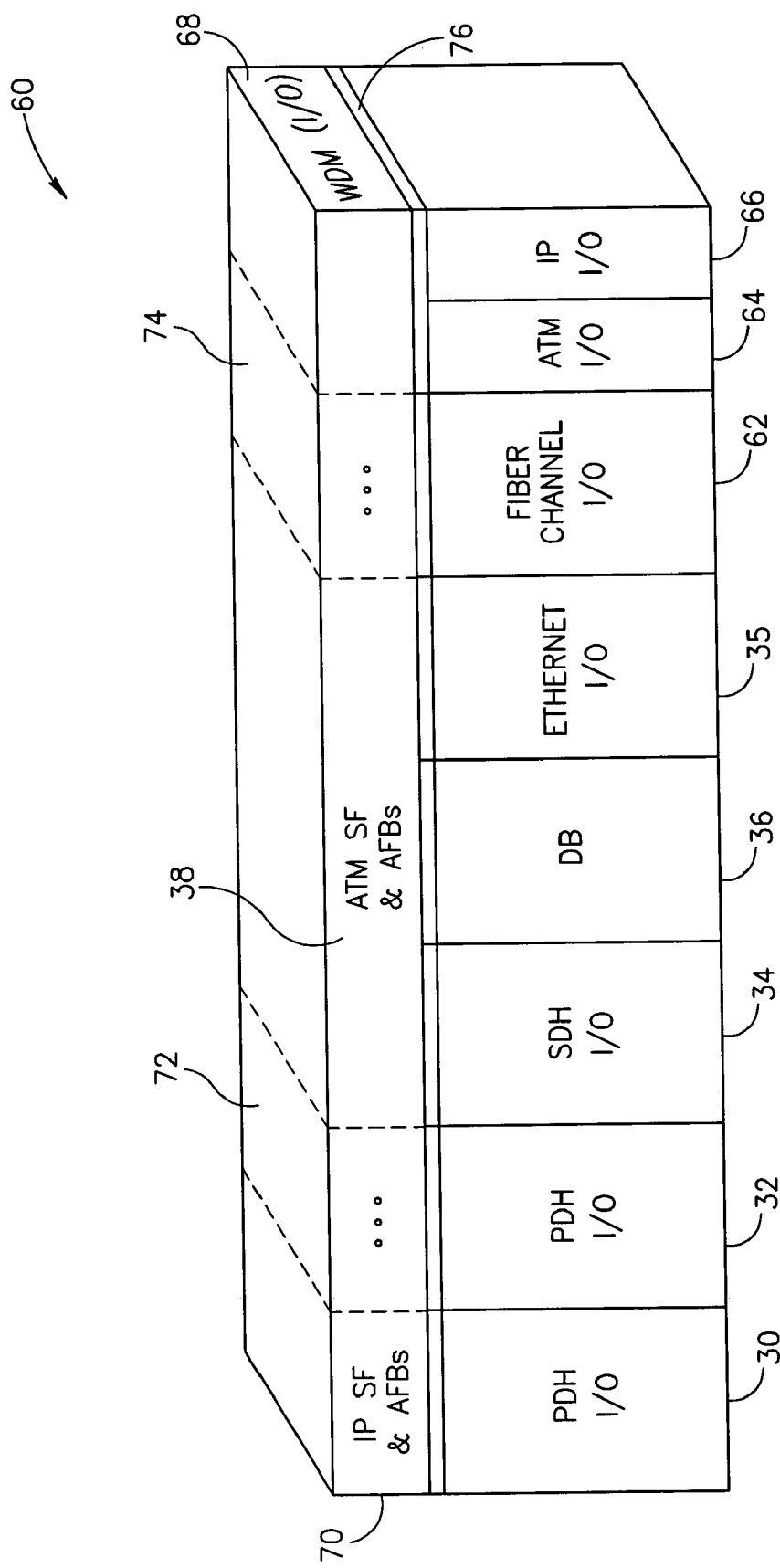
FIG. 5 is a pictorial presentation of an exemplary modular assembly of the proposed ATM switching device.

FIG. 5 illustrates how cards of the main blocks of the proposed switching structure can be composed. A housing 60 contains blocks of an exemplary switching structure in a number of slots. The main slot contains a printed circuit 38 comprising an ATM switch (SF) integrally interconnected with a plurality of adaptation functional blocks AFBs, and the following separately inserted cards in the respective slots, where previously used numbers will be utilized:

PDH I/O block 30, another PDH I/O block 32, SDH I/O block 34, DB cross-connect 36, Ethernet I/O block 35, and also optional Fiber Channel I/O block 62, ATM I/O block 64, IP I/O block 66, WDM I/O block 68, and also additional switching fabrics IP SF 70, and any optional switching fabrics (Ethernet, Fiber Channel, etc.) in the slots 72 and 74.

The housing comprises a back plane schematically shown as a thick layer and marked 76.

Using the DB, a flexible, cost effective and upgradable switching structure is obtained. All connections are performed using the back plane, without any interfaces and any connecting fibers/wires.

Preferably, the structure 60 is capable of performing ATM switching for a considerable number of E1 data streams which are to be processed by IMA function incorporated in the printed circuit 38. However, the structure can be used for other purposes, for example for assembling a multi-service multi ADM.

It is to be understood that the above description serves only for demonstrating certain embodiments of the invention. Numerous other ways of carrying out the invention provided may be devised by a person skilled in the art without departing from the scope of the invention, and are thus encompassed by the present invention.

The invention claimed is:

1. A switching device for telecommunication networks, comprising:
    a number of I/O ports for inputting incoming data streams and outputting outgoing data streams of arbitrary protocols, said I/O ports being arranged in groups while said groups being respectively positioned on two or more I/O cards;
    at least a basic switching fabric SF block for handling internal data streams,
    a number of adaptation functional blocks AFBs associated with at least said basic switching fabric SF block and forming a common pool of AFBs of at least said basic SF block, wherein each AFB being capable of performing at least one of the following adaptation functions:
        i. converting one or more of said incoming data streams or of portions of said incoming data streams into one or more said internal data streams suitable for being handled in the SF; and
        ii. converting one or more said internal data streams handled by the SF into one or more said outgoing data streams or portions thereof; and
    a cross-connecting distribution block DB for switching between said I/O ports and said adaptation functional blocks AFBs and configurable to provide a required connection between any of said I/O ports positioned on any of said I/O cards, and any of said adaptation functional blocks AFBs from said common pool of AFBs.

2. The switching device according to claim 1, wherein the basic switching fabric SF block comprises an ATM switch (ATM SF).

3. The switching device according to claim 1, wherein said AFB blocks form integral part of at least said basic switching fabric SF block.

4. The switching device according to claim 1, wherein the distribution block DB is configurable to interconnect between any of said I/O ports in any of said I/O cards and any other of said I/O ports in any of said I/O cards.

5. The switching device according to claim 1, wherein the distribution block DB comprises one or more ingress/egress connections and is further configurable to interconnect any of said I/O ports to any of said ingress/egress connections thereby enabling traffic to exit said DB and access from outside to said DB.

6. The switching device according to claim 5, comprising an additional switching fabric block associated with an additional group of adaptation functional blocks AFB, the additional switching fabric block being connectable to the I/O cards via the ingress/egress connections of said DB.

7. The switching device according to claim 6, wherein the additional switching fabric block is of the same type as the basic switching fabric block.

8. The switching device according to claim 6, wherein the additional switching fabric block is capable of handling internal data streams having a protocol other than the protocol of the internal data streams of the basic switching fabric block.

9. The switching device according to claim 1, wherein the DB is configurable to perform protection functions.

10. The switching device according to claim 1, adapted to handle the incoming data streams having protocol(s) selected from the following non-exhaustive list comprising: ATM, IP, Ethernet, PDH (TDM), SDH/SONET(TDM), Frame relay, Optical signals.

11. The switching device according to claim 1, wherein said distribution block DB is a TDM non-blocking matrix capable of switching PDH and SDH/SONET high order and low order data streams.

12. The switching device according to claim 1, wherein one of said adaptation functional blocks AFB is designed for implementing IMA adaptation function (Inverse Multiplexing over ATM).

13. The switching device according to claim 1, adapted for serving cellular communication networks, so that at least one of the incoming data streams and/or of the outgoing data streams is of a cellular communication network protocol.

14. The switching device according to claim 10, wherein said distribution block DB is a TDM non-blocking matrix capable of switching PDH and SDH/SONET high order and low order data streams, and wherein at least some of said I/O ports are provided with means for formatting the incoming data streams into the SONET/SDH format.

15. An assembly to be used in a switching device, wherein the switching device is intended for inputting incoming data streams of arbitrary protocols via I/O cards each comprising a group of I/O ports, converting the incoming data streams into internal data streams by adaptation functional blocks AFBs, handling the internal data streams in a switching fabric SF, converting the internal data streams into outgoing data streams of arbitrary protocols by the adaptation functional blocks and outputting the outgoing data streams via the I/O blocks, and wherein the assembly comprises the switching fabric SF, composed of at least a basic SF block, integrally interconnected with a number of said adaptation functional blocks forming a cool of AFBs, so that said I/O cards are separated from said adaptation functional blocks, thereby allowing for providing selective connections between any I/O port in any of said I/O cards and any adaptation functional block of said pool of AFBs.

16. The assembly according to claim 15, wherein the basic switching fabric block is an ATM switching fabric ATM SF.

17. The assembly according to claim 16, comprising at least one adaptation functional block capable of performing IMA function (Inverse Multiplexing over ATM) with respect to a number of the incoming/outgoing data streams.

18. The assembly according to claim 15, wherein each AFB is capable of performing at least one of the following adaptation functions:
converting one or more of said incoming data streams or of portions of said incoming data streams into one or more said internal data streams suitable for being handled in the SF; and
converting one or more said internal data streams handled by the SF into one or more said outgoing data streams or portions thereof.

19. A method of switching data streams in a switching structure comprising a number of I/O ports arranged by groups placed on respective I/O cards, a number of adaptation functional blocks AFBs forming a pool, and a switching fabric SF, the method comprises the steps of:
inputting incoming data streams of arbitrary protocols via I/O ports placed on different said I/O cards;
formatting at least some of the incoming data streams to obtain all incoming data streams in a common format suitable for further distribution;
selectively distributing the thus formatted incoming data streams or portions thereof between the adaptation functional blocks of the pool so that any such incoming data stream or portion thereof is connectable to any selected AFB of the pool;
converting the thus formatted incoming data streams or portions thereof, into internal data streams by the selected adaptation functional blocks AFBs;
handling the internal data streams at the switching fabric SF;
converting the internal data streams, by the adaptation functional blocks of the pool, into data streams formatted using the common format; and
distributing the thus obtained formatted data streams between the I/O cards and I/O ports to be further outputted in arbitrary protocols.

20. The method according to claim 19, wherein the SF comprises at least a basic ATM SF block, and the step of distribution is provided at the SDH/SONET (TDM) or PDH (TDM) format.

* * * * *